UNITED STATES PATENT OFFICE.

AUBREY D. CHARLES, OF BELLOWS FALLS, VERMONT, ASSIGNOR TO CASEIN COMPANY OF AMERICA, A CORPORATION OF NEW JERSEY.

PROCESS OF PRODUCING CASEIN.

SPECIFICATION forming part of Letters Patent No. 721,999, dated March 3, 1903.

Application filed January 12, 1903. Serial No. 138,742. (No specimens.)

*To all whom it may concern:*

Be it known that I, AUBREY D. CHARLES, a citizen of the United States, residing at Bellows Falls, in the county of Windham and State of Vermont, have invented or discovered certain new and useful Improvements in Processes of Producing Casein, of which the following is a specification.

In making casein when the whey is to be utilized for the manufacture of milk-sugar it is necessary to use muriatic acid as a precipitant for the curd from the milk, for the reason that small percentages of muriatic acid left in the whey do no harm, whereas if sulfuric acid be employed as the precipitant even small percentages thereof in the whey would be detrimental to the milk-sugar.

It is a well-known fact that casein precipitated from milk with muriatic acid makes very thick solutions—that is to say, casein which has been precipitated by muriatic acid when dissolved in six times its weight of water with the alkali used as a solvent produces about the same thickness of solution as casein which has been precipitated by sulfuric acid when dissolved in about four times its weight of water—and this thick solution is very undesirable for many purposes, particularly if the casein solution is to be utilized for waterproofing and coating paper, which is a purpose for which immense quantities of casein are now employed and in which use thin solutions are desirable.

This invention or discovery has for its object to provide a product of casein which has been precipitated by muriatic acid, but from which thin casein solutions may be produced.

In practicing the new process the curd is precipitated from the milk with the smallest amount of muriatic acid possible and with the milk preferably at a temperature of about 120° Fahrenheit. After the precipitation is complete the whey is drained off and the curd is washed with water, preferably heated to from 130° to 140° Fahrenheit and containing a small percentage of sulfuric acid. The amount of acidulated water introduced into the vat should be sufficient to cover all of the wet curd, and the proportion of sulfuric acid in this wash-water will be about twenty-two ounces to about one thousand gallons or so of water. The curd is then worked in this dilute-sulfuric-acid solution until it is in condition to be pressed. The addition of the sulfuric acid to the wash-water has a very pronounced effect upon the curd, changing its character, so that the surplus water may be readily pressed out of the curd by placing the same between cloths—a procedure which is very difficult or impossible with muriatic-acid-precipitated curd that has not been subjected to this dilute-sulfuric-acid treatment. It has been discovered that the muriatic-acid-precipitated casein which has been subjected to this dilute-sulfuric-acid treatment makes a solution which is essentially the same as a casein solution made from sulfuric-acid-precipitated curd in that thin solutions of the muriatic-acid-precipitated curd which has been subjected to the dilute-sulfuric-acid treatment are obtained with a comparatively small amount of water with the alkali used for the solutions.

In practicing the invention or discovery the following formula is found to produce the best results: Take about six and one-half cans or five hundred and twenty-five pounds of milk and heat same to 120° Fahrenheit and then precipitate the curd by the use of twenty-six ounces of muriatic acid. After the precipitation is complete drain off the whey and then wash the curd in about one thousand gallons of water heated to from 130° to 140° Fahrenheit and containing twenty-two ounces of sulfuric acid. Then work the curd in this acidulated water until it is in a condition to press, drain and press the curd, and thereafter dry it at a temperature of about 130° Fahrenheit.

The invention or discovery, however, is not to be understood as being limited to the exact temperatures or the exact proportions just stated, as these may be varied somewhat without departing from the essence of the invention or discovery or without losing the advantages resulting therefrom.

Having thus described my invention or discovery, I claim and desire to secure by Letters Patent—

1. The herein-described process for producing casein, consisting in precipitating curd from milk with muriatic acid and subsequently washing the curd with a dilute-sulfuric-acid solution.

2. The herein-described process for producing casein, consisting in precipitating curd from milk with muriatic acid and subsequently washing the curd with a dilute sulfuric acid, and subsequently pressing and drying the curd.

3. The herein-described process for producing casein consisting in precipitating curd from milk with muriatic acid at a temperature of about 120° Fahrenheit, and then washing the curd with a dilute-sulfuric-acid solution heated to about 130° to 140° Fahrenheit, and subsequently pressing the curd and drying the same at a temperature of about 130° Fahrenheit.

In testimony whereof I affix my signature in presence of two witnesses.

AUBREY D. CHARLES.

Witnesses:
D. W. LINTON,
A. F. GRIGNON.